(12) United States Patent
Girard

(10) Patent No.: US 6,598,638 B2
(45) Date of Patent: Jul. 29, 2003

(54) ACCESSORY FOR A FLAP

(75) Inventor: Dominique Girard, Chateagay (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 10/245,937

(22) Filed: Sep. 18, 2002

(65) Prior Publication Data
US 2003/0019556 A1 Jan. 30, 2003

Related U.S. Application Data

(63) Continuation of application No. PCT/EP01/02941, filed on Mar. 15, 2001.

(30) Foreign Application Priority Data

Mar. 21, 2000 (FR) .............................. 00 03689

(51) Int. Cl.⁷ .............................. B60C 5/00; B60C 5/02; B60C 5/16; B60C 29/06
(52) U.S. Cl. .......................... 152/501; 152/514
(58) Field of Search ................. 152/501, 513, 152/514, 400, 401

(56) References Cited

U.S. PATENT DOCUMENTS

| | | |
|---|---|---|
| 2,773,535 A | 12/1956 | Tolonen |
| 3,866,653 A | 2/1975 | Lejeune |
| 4,453,581 A | 6/1984 | Easterly |

FOREIGN PATENT DOCUMENTS

| | | | |
|---|---|---|---|
| GB | 235137 | 8/1925 | |
| JP | 01297301-a | * 11/1989 | .............. 152/501 |
| JP | 05169902 A1 | * 7/1993 | .............. 152/501 |

* cited by examiner

Primary Examiner—Adrienne C. Johnstone
(74) Attorney, Agent, or Firm—Martin Farrell; Christopher P. Crecente; Alan A. Csontos

(57) ABSTRACT

The present invention provides an accessory for a flap for use with an inner tube and wheel, comprising a base of oblong shape whose upper face is provided with a rigid insert in the form of a hollow cylinder, said accessory being made by molding a single material that resists creep up to a temperature of 180° C., to prevent the flap creeping through an orifice in the wheel.

6 Claims, 1 Drawing Sheet

ACCESSORY FOR A FLAP

This application is a continuation of and claims right of priority to PCT application PCT/EP01/02941 filed Mar. 15, 2001, published in the French language on Sep. 27, 2001 as WO 01/70542 A1.

BACKGROUND OF THE INVENTION

1. Field of the Invention

The present invention concerns an accessory for a flap. The accessory is used to cover the valve passage opening in the rim of a wheel. More particularly, it is normally used in an assembly consisting of a wheel rim, a flap, an inner tube, and a tire. The accessory prevents the flap from creeping into the valve passage opening over time, or even under severe operating conditions.

2. Description of Related Art

Tires with an inner tube require the use of a flap. As is known, a flap is an elastomer protection ring arranged between the inner tube on one side and the bottom of the rim groove and the tire beads on the other side. The flap prevents the inner tube from being pinched between the rim and the beads; it protects the inner tube from contact with or rubbing against the rim. This is particularly useful because a wheel rim can reach quite high temperatures during rolling, bearing in mind the proximity of the braking mechanism.

One of the problems associated with the use of a flap results from its creeping through the valve passage orifice present in the rim under the action of the pressure exerted by the inner tube combined with the heat from the brakes; in effect, it is found that under these conditions the flap becomes progressively squeezed through said orifice. This mechanism generally induces a local thinning of the flap in the area of the valve orifice; it follows that the valve stem, which is then displaced in the direction of the rim, risks coming into frictional contact with the brake drum with easily imaginable consequences.

To prevent the flap from creeping into the valve passage orifice, patent FR 2 177 645 proposes a reinforcement assembly consisting on the one hand of a rigid insert, for example made of a plastic material, which is fitted into the orifice of the flap designed to allow passage of the valve and forms the inside wall thereof, and on the other hand a layer of reinforced elastomer mix that forms a lining of the radially inside surface of the flap all round said insert. The rigid insert and the reinforced elastomer layer restrict the creep of the flap into the rim's valve passage orifice; in addition, the insert prevents displacement of the valve stem towards the brake drum. However, this solution proposing the use of an elastomer layer is not satisfactory when the conditions under which the tire provided with the reinforcement assembly in question is used result in heating of the flap to temperatures above 90° C. to 100° C., a temperature range in which the elastomer itself undergoes creep. On the other hand, the production and then fitting of said assembly to its flap turn out to be complex because numerous steps are involved: molding and then positioning of the insert, production of the reinforced elastomer layer and then its bonding to the flap, for example by means of a press.

BRIEF SUMMARY OF THE INVENTION

The aim of the present invention is to propose a flap accessory which does not suffer from the drawbacks of the state of the prior art and which, in particular, makes it possible to restrict or eliminate the creep of the flap into the valve passage orifice. The flap accessory according to the invention is a molded element comprising a base of essentially oblong shape with one face designed to be in contact with a flap in the fitted position and a hollow, cylindrical insert projecting from said face of said base, said base being provided with an orifice at the end of the insert to allow the passage of an inflation valve stem through the insert. In addition, the accessory according to the invention is formed in one piece from a moldable, thermally resistant material, i.e. a material which can resist temperatures up to at least 180° C. without showing virtually any creep as a function of time.

This good temperature resistance makes it possible to prevent creep of the flap with time and prevents said flap from moving partly into the valve passage orifice of the rim, even if elevated temperatures are reached as a result of especially severe rolling conditions, in particular repeated braking.

The flap accessory according to the invention is preferably made from a plastic material, in particular polyamide.

The base of said accessory is in the form of a thin plate designed to be inserted between the rim and the flap and having an area such that said plate covers the rim valve passage orifice and extends beyond the orifice on all sides. As for the cylindrical insert, this is designed to be inserted with a push fit into the cylindrical valve passage orifice provided in the flap, forming the inside wall thereof while ensuring contact between the plate forming the base and the flap itself and keeping said base in position regardless of the forces imposed respectively on the flap and on the rim. "Push fit" means that the insert is introduced into the flap by deforming the flap elastically so that said flap exerts radial forces on the insert in order to hold the latter firmly in the flap.

Advantageously, the material constituting the base of the accessory should confer upon said base an appropriate longitudinal bending flexibility so that the base can deform as far as necessary to follow the rounded shape of the flap.

In a variant embodiment, the base of the accessory is provided on its face intended to be in contact with the flap, with ribs or relief projections extending transversely relative to the major dimension of the base and across the whole of the minor dimension; these ribs or projections, which may or may not be regularly spaced, are designed to reduce or prevent creep of the material constituting the flap parallel to said base, and to confer upon the base a greater bend rigidity about an axis extending essentially in the direction perpendicular to the direction of the ribs.

To facilitate the passage of the valve stem through the insert at the time of fitting or removal, the insert according to the invention is provided with at least one opening having appropriate dimensions, formed in the area of its connection to the base.

BRIEF DESCRIPTION OF THE DRAWINGS

The invention just described will be better understood with the help of the explanation and the figures presented below, which refer to a non-limiting example embodiment.

DETAILED DESCRIPTION OF THE INVENTION

Figure 1:
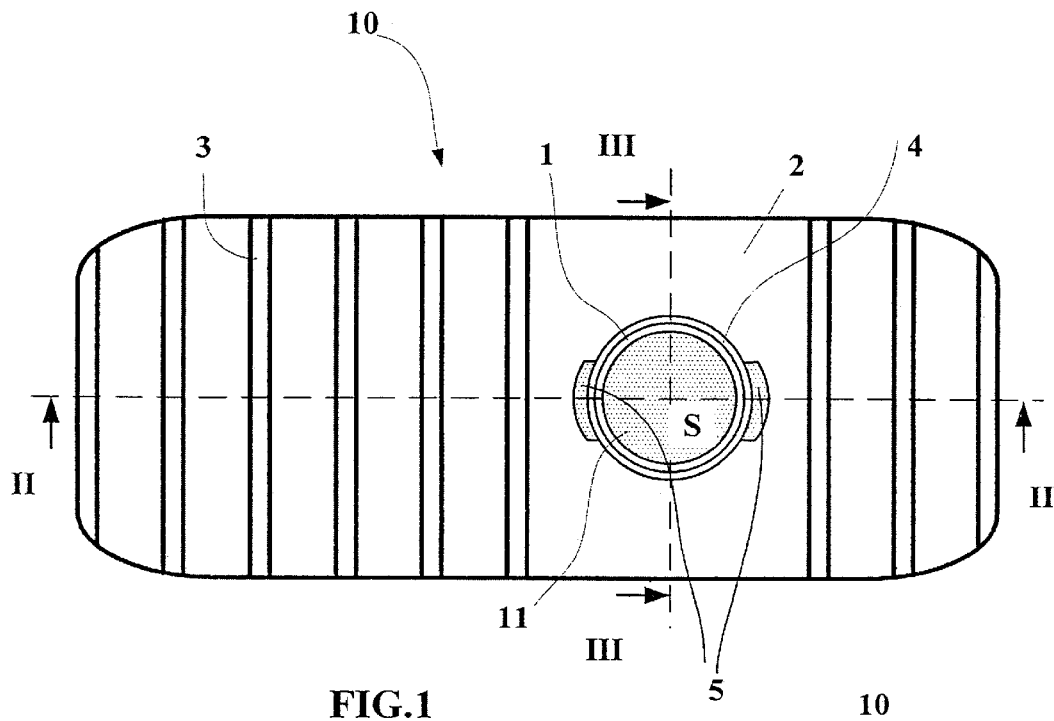
FIG. 1 shows a plan view of the outside face of the accessory designed to be in contact with a flap.

The accessory 10 according to a variant illustrated in FIG. 1 has an essentially oblong shape and consists of an insert 1 and a base 2, the insert and base together forming a single element molded from a thermally resistant material. The view in FIG. 1 shows the face of the accessory intended to come into contact with the radially inside surface of a flap when the flap is in place inside a tire fitted to a wheel rim.

As shown in FIG. 1, the base 2 of the accessory 10 is in the form of a thin plate having a rectangular shape extended on each of its small sides by two truncated half-discs (in this variant it is essentially of oblong shape, but of course any shape may be appropriate provided that the valve passage orifice in the rim is covered by the accessory). Preferably, the area of the base should be such that it can cover the rim's valve passage orifice and extend beyond it in all directions in the plane of said base by at least 5 mm. The plate forming the base 2 is perforated by an orifice 11 (shown in FIG. 1 as a shaded area indexed S) and has the insert 1 of hollow cylindrical shape arranged so as to form an extension of said orifice 11. The insert 1 is formed in one piece with the base 2 and is not centrally positioned along the length of the base, so that it corresponds to the position of the valve passage orifice provided in the flap in which it is to be inserted. However, the insert 1 is centered in the direction of the width of the base 2.

The thickness of the plate forming the base 2 is preferably chosen between 0.5 mm and 2.5 mm.

As in the patent FR 2 177 645 of the prior art, the height of the insert measured relative to the face of the base from which it projects is such that if the flap creeps during rolling, the part of the valve resting on the radially external crown of the flap's valve orifice will be supported against the upper part of the insert and cannot be pushed into contact with the brake drum.

In the example shown, the accessory 10 is molded from polyamide (nylon 66), which provides said accessory with satisfactory resistance to thermal creep up to a temperature of 190° C. However, there is no restriction on the choice of the material provided that it can be molded and ensure good dimensional stability when raised to temperatures up to at least 180° C., and also provided that it confers upon the base appropriate deformation elasticity to be able to adapt to and follow the geometry of the flap.

On the face of the base 2 intended to come in contact with a flap (this face corresponding to the face from which the insert 1 projects), rectilinear ribs 3 are molded at regular intervals along the entire length of said base on either side of the insert zone. These ribs are preferably continuous and of a height sufficient to create a sort of anchorage of the base in the material constituting the flap, thereby reducing the deformation of the flap in a direction essentially parallel to the base, especially when the flap is subjected to severe temperature conditions. In the example described the ribs 3 are shaped as half-cylinders, but this shape is of course not limiting.

Figure 2:
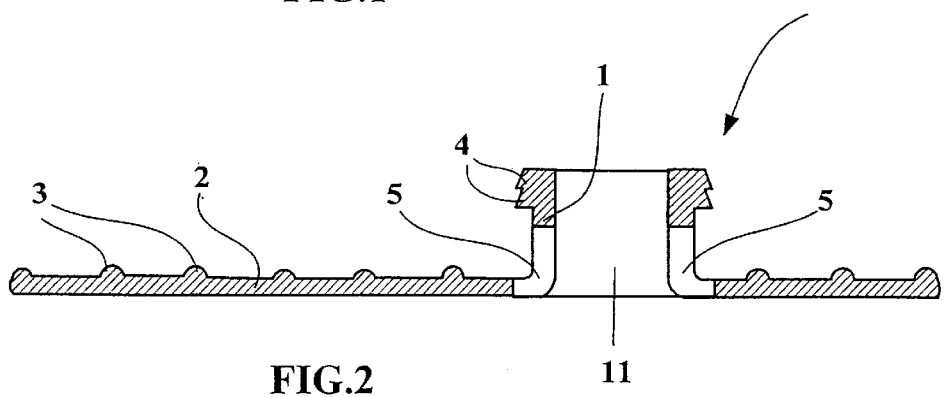
FIG. 2 shows a cross-section of the accessory illustrated in FIG. 1, in the direction of its length along the section plane 11—11.

As shown by FIG. 2, which represents the cross-section of the accessory 10 illustrated in FIG. 1 along the line II—II, the insert 1 has the shape of a cylinder slightly widened out in its area of connection to the base 2, and is provided in its area furthest away from said base 2 with several thicker portions 4 formed as rings which surround the insert 1 all the way round on its outer face (corresponding to the face that will be in contact with the flap during the fitting of the insert into the valve passage orifice provided in the flap). The role of these thicker portions 4 is to allow the insert to be introduced though the orifice in the flap but to prevent it from coming out unintentionally or accidentally. It is advisable to give these thicker portions a shape appropriate for that function; in the example chosen and seen in the cross-section shown in FIG. 2, an essentially saw-tooth shape has been chosen, the thickness of each tooth increasing towards the base 2. The orifice 11 at the end of the insert 1 allows the passage of a valve stem. To facilitate this passage, openings 5 are provided in the insert 1.

Figure 3:
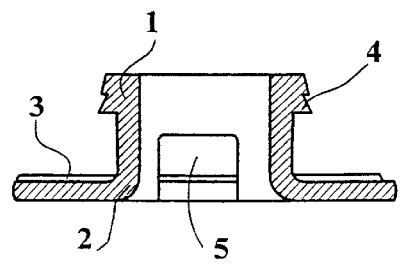
FIG. 3 shows a cross-section of the accessory of FIG. 1 along a section plane III—III perpendicular to the section plane II—II.

In the cross-section along the line III—III of the accessory 10 shown in FIG. 3, it is easier to see the two diametrically opposed openings 5 provided in the insert 1 in the area of its connection to the base 2. The role of these openings 5 is to facilitate the insertion of the valve through the insert.

What is claimed is:

1. An accessory for a flap, said flap positionable between an inner tube of a pneumatic tire and a mounting rim for said pneumatic tire, said rim having a valve passage orifice, and said flap having a cylindrical valve passage orifice, said accessory being a molded element made from a single moldable material which resists creep up to a temperature of 180 degrees C., having a base of essentially oblong shape, wherein a face of said base for contacting said flap has a rigid insert having the shape of a hollow cylinder projecting from said face of said base, said base being provided with an orifice at the end of the insert to allow the passage of an inflation valve stem through the insert, wherein said base is sufficiently large so as to cover said valve passage orifice on said rim to prevent the flap creeping through said orifice on said rim.

2. The accessory for a flap according to claim 1, wherein the base of essentially oblong shape for covering the valve passage orifice on the rim is sufficiently large to extend beyond the valve passage orifice in all directions in the plane of said base by at least 5 mm.

3. The accessory for a flap according to claim 1, wherein said single moldable material is a plastic material.

4. The accessory for a flap according to claim 1, wherein the base comprises several projections on its face to contact with said flap, said projections extending transversely relative to the major dimension of the base and across the whole of the minor dimension.

5. The accessory for a flap according to claim 4, wherein the insert has on its outside surface thickened portions shaped to permit the insert to be introduced into the orifice provided in the flap and to resist emergence from said orifice.

6. Accessory for a flap according to claim 1, wherein the insert is provided with at least one opening in the area of its connection to the base, of dimensions appropriate to facilitate the positioning of the valve stem in the insert.

* * * * *